(12) United States Patent
Cheng et al.

(10) Patent No.: US 11,163,215 B2
(45) Date of Patent: Nov. 2, 2021

(54) IMAGE CAPTURING APPARATUS WITH SAFETY PROTECTION

(71) Applicants: Chen-Hsien Cheng, Taipei (TW); Li-Fang Chen, Taipei (TW); Ruei-Hong Hong, Taipei (TW)

(72) Inventors: Chen-Hsien Cheng, Taipei (TW); Li-Fang Chen, Taipei (TW); Ruei-Hong Hong, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 16/937,606

(22) Filed: Jul. 24, 2020

(65) Prior Publication Data

US 2021/0141289 A1    May 13, 2021

Related U.S. Application Data

(60) Provisional application No. 62/932,440, filed on Nov. 7, 2019.

(51) Int. Cl.
  *G03B 17/02* (2021.01)
(52) U.S. Cl.
  CPC .................................. *G03B 17/02* (2013.01)
(58) Field of Classification Search
  CPC ...................................................... G03B 17/02
  USPC ......................................................... 396/535
  See application file for complete search history.

(56) References Cited

U.S. PATENT DOCUMENTS

| 5,481,257 A | * | 1/1996 | Brubaker | H04N 7/185 340/12.55 |
| 5,782,868 A | * | 7/1998 | Moore, Jr. | A61J 17/02 606/235 |
| 2001/0047189 A1 | * | 11/2001 | Griffith | A61J 17/001 606/234 |
| 2005/0251211 A1 | * | 11/2005 | Knifong | A61J 17/001 606/234 |
| 2012/0174870 A1 | * | 7/2012 | Grabois | A01K 63/003 119/253 |
| 2016/0074764 A1 | * | 3/2016 | Chen | A63H 5/00 446/227 |
| 2018/0133613 A1 | * | 5/2018 | Bearsch | G03B 29/00 |

FOREIGN PATENT DOCUMENTS

| CN | 207895724 U | * | 9/2018 |
| CN | 209897173 U | * | 1/2020 |

* cited by examiner

*Primary Examiner* — Christopher E Mahoney
(74) *Attorney, Agent, or Firm* — JCIPRNET

(57) ABSTRACT

An image capturing apparatus characterized by safety protection includes a body and a protruding assembly. The protruding assembly is assembled to the body from the inside of the body and protrudes out of the body. The protruding assembly includes a fixing member and at least one flexible member. The fixing member is assembled to the body, and the at least one flexible member is disposed on the fixing member and is assembled to the body together with the fixing member. The flexible member passes through an opening of the body from the inside of the body to protrude out of the body.

10 Claims, 4 Drawing Sheets

IMAGE CAPTURING APPARATUS WITH SAFETY PROTECTION

CROSS-REFERENCE TO RELATED APPLICATION

This application claims the priority benefit of U.S. provisional application Ser. No. 62/932,440, filed on Nov. 7, 2019. The entirety of the above-mentioned patent application is hereby incorporated by reference here and made a part of this specification.

BACKGROUND

Technical Field

The disclosure relates to an image capturing apparatus, and in particular to an image capturing apparatus characterized by safety protection.

Description of Related Art

With the advancement of technology, a telehealth care system has become one of the necessary technologies for taking care of infants, toddlers, or the elderly at home, and the system transmits images of the care receiver to the caregiver through an image capturing apparatus, so that the caregiver is able to receive the real-time images and knows the current situation of the care receiver, which facilitates the process of making records or providing corresponding care. What is more, the caregiver may interact with the care receiver through the audio and video functions provided by the image capturing apparatus.

In addition to the above basic functions, the image capturing apparatus tailored for infants and toddlers may also serve as a toy to attract attention of the infants and the toddlers through the audio-visual effect. Certainly, such a demand may bring challenges to the image capturing apparatus. According to the related art, products that meet the above requirements are not yet available on the market. In addition to the aforesaid basic functions, the structural strength and durability of the image capturing apparatus and whether it is safe for infants and toddlers should also be taken into consideration.

SUMMARY

The disclosure provides an image capturing apparatus characterized by safety protection, which takes both the image capturing function and safety protection into account, so that the image capturing apparatus may serve as a safe toy for infants and toddlers.

According to an embodiment of the disclosure, an image capturing apparatus characterized by safety protection includes a body and a protruding assembly, wherein the protruding assembly is assembled to the body from the inside of the body and protrudes out of the body. The protruding assembly includes a fixing member and at least one flexible member. The fixing member is assembled to the body, the flexible member is disposed on the fixing member and assembled to the body together with the fixing member. The at least one flexible member passes through an opening of the body from the inside of the body and protrudes out of the body.

In an embodiment of the disclosure, the fixing member is thermally welded to an inner wall of the body.

In an embodiment of the disclosure, the above fixing member is locked to an inner wall of the body.

In an embodiment of the disclosure, the above fixing member is latched to an inner wall of the body.

In an embodiment of the disclosure, the fixing member is welded to an inner wall of the body at a high frequency.

In an embodiment of the disclosure, the fixing member has at least one locking hole and a first protruding rib, and an inner wall of the body has at least one locking protruding pillar and a second protruding rib. The first protruding rib leans against the second protruding rib, and at least one locking member passes through the at least one locking hole and is locked to the at least one locking protruding pillar, so as to assemble the fixing member to the body.

In an embodiment of the disclosure, a curvature of the inner wall of the body at a location of the at least one locking protruding pillar is smaller than a curvature of the inner wall at a location of the second protruding rib.

In an embodiment of the disclosure, the fixing member further has a carrier, the at least one locking hole and the first protruding rib are located at peripheries of the carrier, and the at least one flexible member is hot-pressed to the carrier.

In an embodiment of the disclosure, a curvature of the carrier is consistent with a curvature of the inner wall of the body.

In an embodiment of the disclosure, the at least one flexible member includes at least one of cloth and foam.

Based on the above, the protruding assembly of the image capturing apparatus is composed of the fixing member and at least one flexible member, the fixing member is assembled to the inner wall of the body, and the at least one flexible member is assembled to the fixing member of the body and passes through the opening at the first casing of the body, so as to protrude out of the body. Accordingly, the protruding assembly acting as an exposed sharp component of the image capturing apparatus may prevent possible damages due to the flexibility and elasticity of its flexible member. That is, when the image capturing apparatus drops, the flexible member of the protruding assembly may achieve a cushioning effect to reduce possible damages. More importantly, when the image capturing apparatus serves as a toy for infants and toddlers, the flexible member may also ensure safety and provide a comfortable touch.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
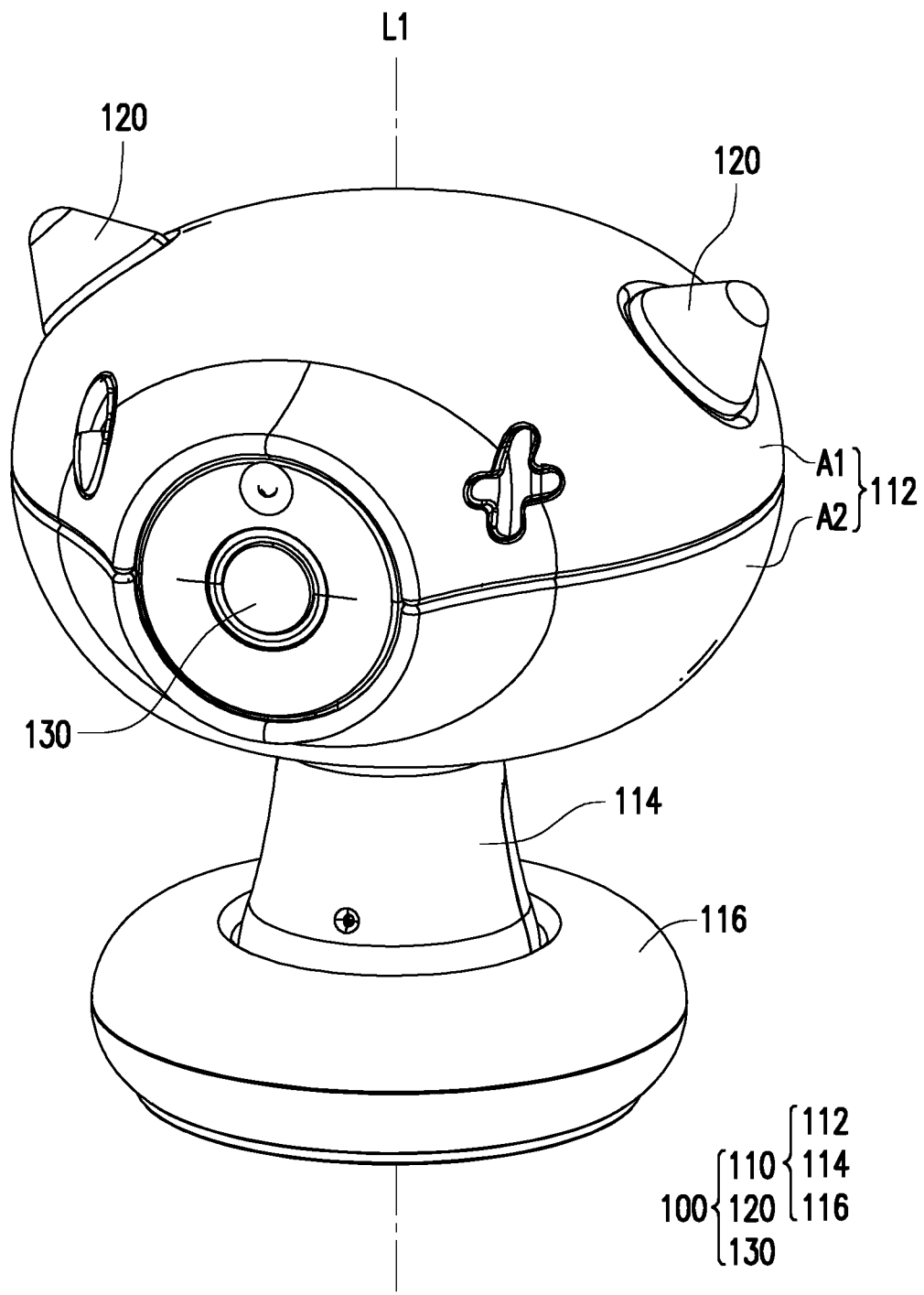
FIG. 1 is a schematic diagram illustrating an image capturing apparatus according to an embodiment of the disclosure.

FIG. 1 is a schematic diagram illustrating an image capturing apparatus according to an embodiment of the disclosure. With reference to FIG. 1, in the embodiment, an image capturing apparatus 100 includes a body 110 and a protruding assembly 120 (here, two protruding assemblies 120 are taken as an example, which should however not be construed as a limitation in the disclosure). The body 110 is further divided into a head 112, a torso 114, and a base 116 sequentially arranged along a central axis L1. Here, the head 112 is assembled by a first casing A1 and a second casing A2 along the central axis L1, the image capturing module 130 is assembled therein, and the protruding assembly 120 is assembled to and protrudes from the first casing A1.

Figure 2:
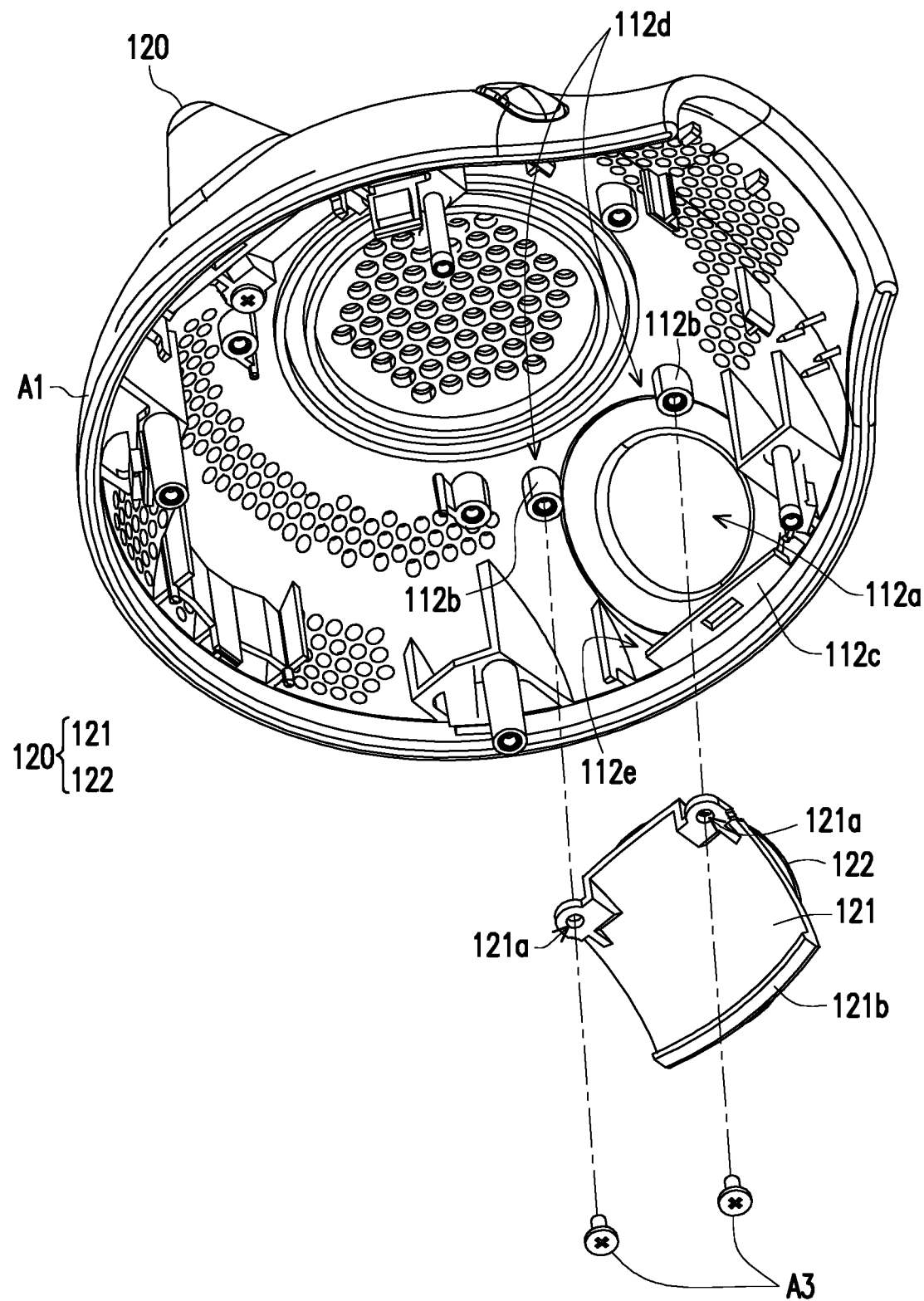
FIG. 2 is a schematic diagram illustrating some components of the image capturing apparatus in FIG. 1.
Figure 3A:
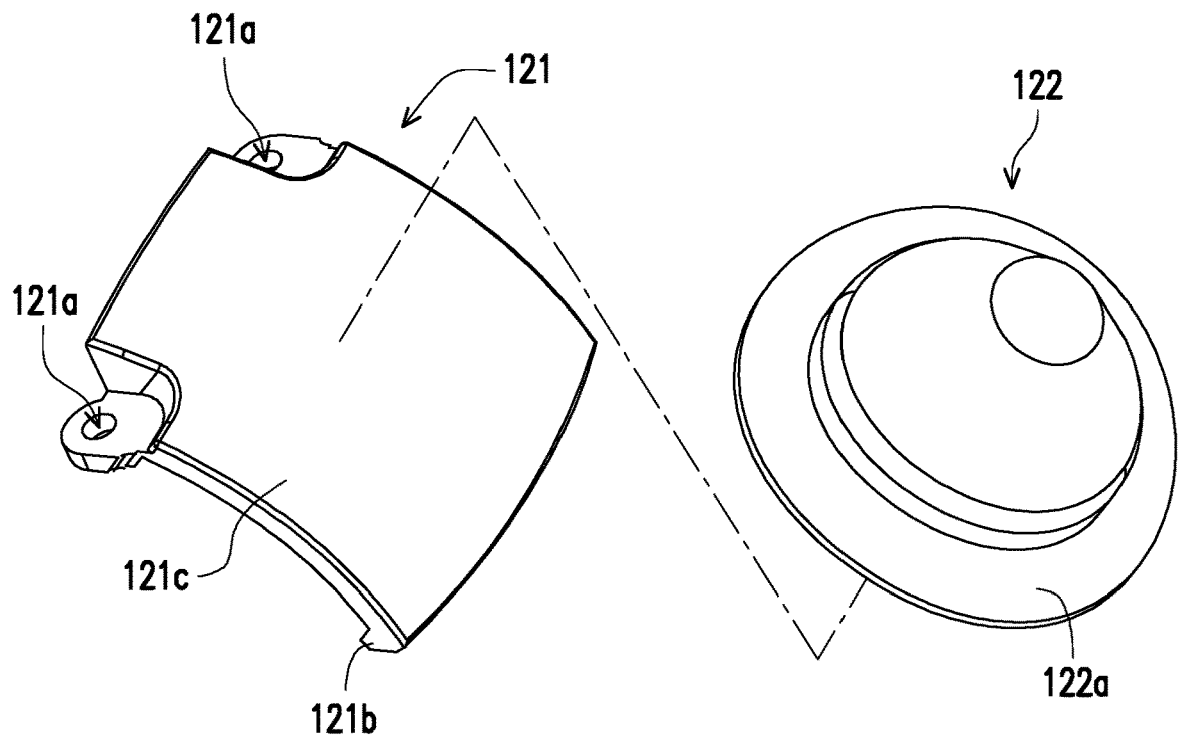
FIG. 3A is an exploded view illustrating a protruding assembly.
Figure 3B:
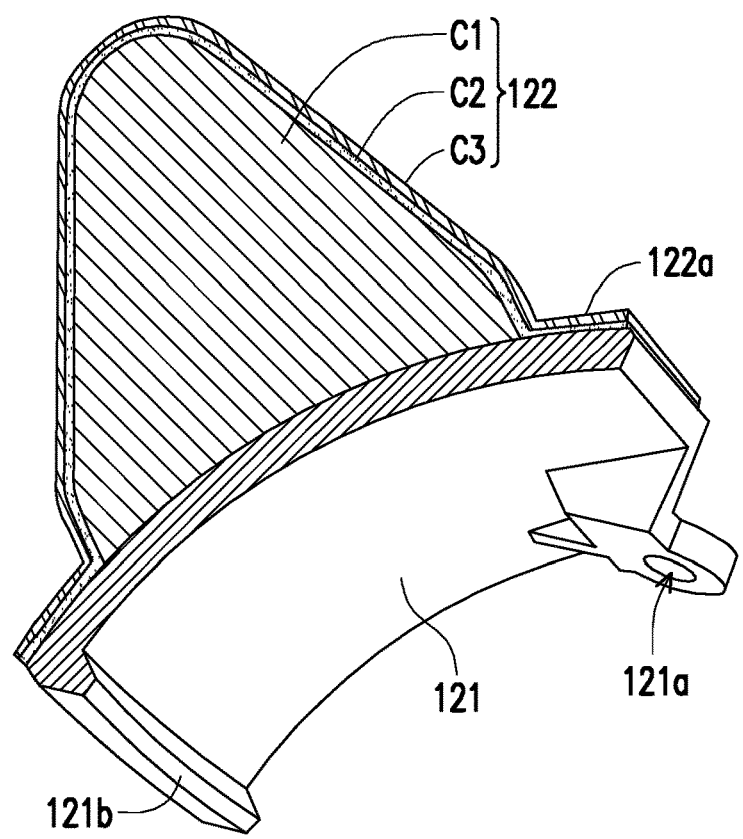
FIG. 3B is a cross-sectional view illustrating the protruding assembly.

FIG. 2 is a schematic diagram illustrating some components of the image capturing apparatus in FIG. 1. FIG. 3A is an exploded view illustrating a protruding assembly. FIG. 3B is a cross-sectional view illustrating the protruding assembly. With reference to FIG. 2, FIG. 3A, and FIG. 3B at the same time, in the embodiment, the protruding assembly 120 is assembled to an inner surface of the first casing A1 from the inside of the body 110, and the protruding assembly 120 passes through an opening 112a and thus protrudes from the first casing A1 of the body 110; therefore, the protruding assembly 120 protrudes out of the body 110, as shown in FIG. 1. However, where the protruding assembly 120 is placed on the body 110 is not limited in the embodiment and is determined according to the appearance of the image capturing apparatus 100, and the protruding assembly 120 may be appropriately arranged on any structure that can protrude out of the body 110.

To be specific, the protruding assembly 120 serves as an external structure of the image capturing apparatus 100. Therefore, if the image capturing apparatus 100 is used in a telehealth care system, the durability of the image capturing apparatus 100 and the safety of users are essential. For instance, if the image capturing apparatus 100 is arranged at a high place, the image capturing apparatus 100 faces the risk of falling from the high place and may be damaged or may even hurt the users. Besides, if the image capturing apparatus 100 further serves as a toy for infants and toddlers, it is necessary to make sure whether the image capturing apparatus 100 can meet the safety requirements.

In view of the foregoing, further restrictions should be imposed on the protruding assembly 120 provided in the embodiment to maintain the structural strength of the protruding assembly 120 without sacrificing the above-mentioned safety requirements. With reference to FIG. 2, FIG. 3A, and FIG. 3B at the same time, in the embodiment, the protruding assembly 120 includes a fixing member 121 and at least one flexible member 122. The flexible member 122 is disposed on the fixing member 121 and is assembled to the first casing A1 of the body 110 together with the fixing member 121, and only the flexible member 122 passes through the opening 112a and protrudes out of the first casing A1 of the body 110.

As shown in the drawings, the fixing member 121 has a locking hole 121a and a first protruding rib 121b, and the inner wall of the first casing A1 of the body 110 has a locking protruding pillar 112b and a second protruding rib 112c. The first protruding rib 121b of the fixing member 121 leans against the second protruding rib 112c, and the locking member A3 passes through the locking hole 121a and is locked to the locking protruding pillar 112b to assemble the fixing member 121 to the first casing A1 of the body 110. The fixing member 121 also has a carrier 121c, the flexible member 122 is disposed on the carrier 121c, the locking hole 121a and the first protruding rib 121b are located at peripheries of the carrier 121c, and the locking hole 121a and the first protruding rib 121b are separated from each other by the carrier 121c. Thereby, when the protruding assembly 120 is assembled in the manner as shown in FIG. 2, the first protruding rib 121b leans against the second protruding rib 112c, and then the fixing member 121 is locked to the locking protruding pillar 112b through the locking member A3, so that the assembling process of locking the fixing member 121 to the inner wall of the body 110 is completed.

Figure 4:
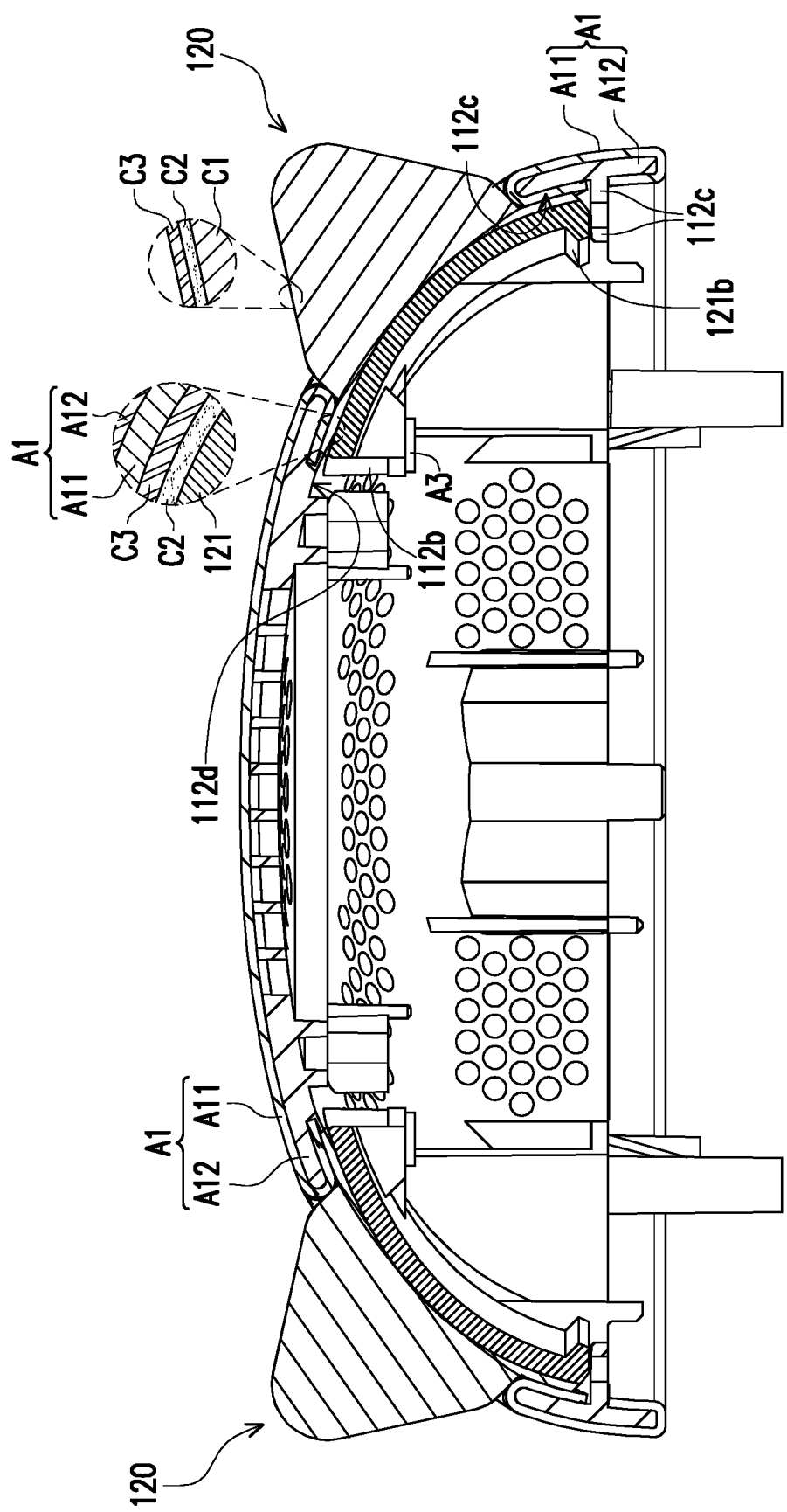
FIG. 4 is a partial cross-sectional view illustrating the image capturing apparatus in FIG. 1.

FIG. 4 is a partial cross-sectional view illustrating the image capturing apparatus in FIG. 1, and particularly the cross-sectional view of the first casing A1 and the protruding assembly 120, so that the corresponding relationship between the protruding assembly 120 and the first casing A1 may be clearly shown. With reference to FIG. 4 and FIG. 2, in the embodiment, a curvature of the inner wall of the first casing A1 of the body at a location of the locking protruding pillar 112b is smaller than a curvature of the inner wall at a location of the second protruding rib 112c; that is, the curvature of the inner wall 112d shown in the drawings is smaller than the curvature of the inner wall 112e. Accordingly, the locking protruding pillar 112b, which is the main assembly structure, is located at a relatively flat region, while the second protruding rib 112c merely serves as a leaning structure and thus may be located at a relatively steep region. This is conducive to lowering the difficulty of forming the first casing A1 of the body 110 by applying an injection molding process. That is, the structures to be assembled (such as the aforesaid locking protruding pillar 112b and peripheral structures) are required to have a strong structural strength and be easily assembled in the manufacturing process, while the structures configured to assist in the assembling process (such as the aforesaid second protruding rib 112c and peripheral structures) may have a lower-level structural strength and may be less affected by the contour of the inner face of the first casing A1. Thereby, it can be deduced that the curvature of the inner wall 112d needs to be smaller than the curvature of the inner wall 112e (i.e., the contour of the inner wall 112d is required to be gentler than the contour of the inner wall 112e, so as to facilitate the injection molding process performed on the relatively high locking protruding pillar 112b).

It should also be mentioned that how the fixing member 121 is assembled to the first casing A1 of the body 110 is not limited in the disclosure; in other embodiments not shown in the drawings, the fixing member may be thermally welded to the inner wall of the body, may be latched to the body by a latching structure (e.g., a latching hook adapted to a latching hole on the first casing), and may be welded to the inner wall of the body at a high frequency.

In addition, with reference to FIG. 3B and FIG. 4, as to the corresponding assembly relationship between the first casing A1 of the body 110 and the protruding assembly 120, the curvature of the carrier 121c of the protruding assembly 120 in its fixing member 121 is consistent with the curvature of the inner wall of the first casing A1 of the body 110, which ensures that the two may well lean against each other without generating assembly tolerances. Besides, the flexible member 122 provided in the embodiment includes a cloth layer C3, a foam sheet C2, and a foam block C1. The foam block C1 is bonded or hot-pressed to the center of the carrier 121c, and the cloth layer C3 and the foam sheet C2 are bonded or hot-pressed to the peripheries of the carrier 121c and wrap up the block foam C1; during the wrapping process, the components may be bonded or adhered to enhance the bonding strength between the components.

As shown in FIG. 4, the protruding assembly 120 of the image capturing apparatus 100, which has a relatively sharp structure, may be characterized by flexibility and elasticity because of its flexible member 122. That is, the protruding assembly 120 may achieve a cushioning effect when the image capturing apparatus 100 drops, and the dropped protruding assembly 120 may return to its original shape due to the elasticity and may also provide a comfortable touch for the users. Even when the users are infants or toddlers, the protruding assembly 120 may provide comfort and safety.

The composition of the flexible member 122 is not limited in the disclosure, and the flexible member 122 includes at least one of cloth and foam and other materials with similar physical properties. The main function of the flexible member 122 is to provide the cushioning effect on the protruding assembly 120. Namely, the flexibility of the part of the protruding assembly protruding out of the body 110 allows the protruding assembly to achieve the cushioning effect when the image capturing apparatus 100 drops and to ensure the safety of the users, e.g., infants and toddlers.

With reference to FIG. 3B and FIG. 4, in the embodiment, the first casing A1 is composed of an outer casing A11 and an inner casing A12, the inner casing A12 is substantially embedded in a wrapping structure formed by the outer casing A11, and the inner casing A12 forms the aforesaid locking protruding pillar 112b and second protruding rib 112c together. On the other hand, the peripheral edge 122a of the flexible member 122 is substantially formed by stacking the cloth layer C3 and the foam sheet C2, and the peripheral edge 122a is sandwiched between two rigid components (the first casing A1 and the fixing member 121). Thereby, the cushioning effect between the rigid components may be achieved due to the flexibility and elasticity of the flexible member 122, and the rigid components may be better engaged together. In addition, an outer surface of the body 110 provided in the embodiment may be further covered by a cloth layer (not shown), which further provides an aesthetic and cushioning effect.

To sum up, the protruding assembly of the image capturing apparatus provided in one or more embodiments of the disclosure is composed of the fixing member and at least one flexible member, wherein the fixing member is assembled to the inner wall of the body, and the flexible member is assembled on the fixing member of the body and passes through the opening at the first casing of the body, so that the protruding assembly may protrude out of the body. Accordingly, the protruding assembly acting as an exposed sharp component of the image capturing apparatus may prevent possible damages due to the flexibility and elasticity of its flexible member. That is, when the image capturing apparatus drops, the flexible member of the protruding assembly may achieve the cushioning effect to reduce possible damages. More importantly, when the image capturing apparatus serves as a toy for infants and toddlers, the flexible member may also ensure safety and provide a comfortable touch. As such, in addition to the basic telehealth care function, the image capturing apparatus may also serve as a toy with safety and durability for infants and toddlers.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. An image capturing apparatus characterized by safety protection and comprising:
    a body;
    a protruding assembly assembled to the body from an inside of the body and protruding out of the body, the protruding assembly comprising:
        a fixing member, comprising a carrier and at least one extension structure protruding from the carrier, the fixing member assembled to an inner wall of the body via the extension structure; and
        at least one flexible member disposed on the carrier and assembled to the body together with the fixing member, the carrier supporting the at least one flexible member to pass through an opening of the body from the inside of the body to protrude out of the body, and a peripheral edge of the at least one flexible member contacted and sandwiched between the inner wall and the carrier.

2. The image capturing apparatus according to claim 1, wherein the at least one extension structure of the fixing member is thermally welded to the inner wall of the body.

3. The image capturing apparatus according to claim 1, wherein the at least one extension structure of the fixing member is locked to the inner wall of the body.

4. The image capturing apparatus according to claim 1, wherein the at least one extension structure of the fixing member is latched to the inner wall of the body.

5. The image capturing apparatus with safety protection as described in claim 1, wherein the at least one extension structure of the fixing member is welded to the inner wall of the body at a high frequency.

6. The image capturing apparatus according to claim 1, where the fixing member has at least one locking hole located on the at least one extension structure and a first protruding rib, the inner wall of the body has at least one locking protruding pillar and a second protruding rib, the first protruding rib leans against the second protruding rib, and at least one locking member passes through the at least one locking hole and is locked to the at least one locking protruding pillar, so as to assemble the fixing member to the body.

7. The image capturing apparatus according to claim 6, wherein a curvature of the inner wall of the body at a location of the at least one locking protruding pillar is smaller than a curvature of the inner wall at a location of the second protruding rib.

8. The image capturing apparatus according to claim 6, wherein the at least one locking hole and the first protruding rib are located at peripheries of the carrier, and the at least one flexible member is hot-pressed to the carrier.

9. The image capturing apparatus according to claim 8, wherein a curvature of the carrier is consistent with a curvature of the inner wall of the body.

10. The image capturing apparatus according to claim 1, wherein the at least one flexible member comprises at least one of cloth and foam.

* * * * *